United States Patent [19]
Endo et al.

[11] Patent Number: 5,272,305
[45] Date of Patent: Dec. 21, 1993

[54] GIRTH-WELDING PROCESS FOR A PIPE AND A HIGH CELLULOSE TYPE COATED ELECTRODE

[75] Inventors: Shigeru Endo; Moriyasu Nagae; Motokiyo Itoh, all of Tokyo; Takeshi Sugino; Shouzou Naruse, both of Fujisawa, all of Japan

[73] Assignees: Kabushiki Kaisha Kobe Seiko Sho, Kobe; NKK Corporation, Tokyo, both of Japan

[21] Appl. No.: 938,444

[22] Filed: Aug. 28, 1992

[30] Foreign Application Priority Data

Aug. 30, 1991 [JP] Japan .................... 3-219954
Sep. 2, 1991 [JP] Japan .................... 3-248248
Jun. 3, 1992 [JP] Japan .................... 4-168576

[51] Int. Cl.⁵ ............................................. B23K 35/22
[52] U.S. Cl. .................................. 219/61; 219/145.23
[58] Field of Search ............ 219/61, 137 WM, 145.23, 219/146.24

[56] References Cited

U.S. PATENT DOCUMENTS 4,517,441  5/1985  Kaljee et al. ............... 219/145.23
5,206,475  4/1993  Wada et al. ............... 219/145.23

Primary Examiner—Clifford C. Shaw
Attorney, Agent, or Firm—Oblon, Spivak, McClelland, Maier & Neustadt

[57] ABSTRACT

Chemical compositions of a base metal and a high cellulose type welding electrode are regulated within predetermined ranges, so that the chemical composition of the weld metal obtained from the welding can be regulated within a predetermined range. Particularly, with respect to the weld metal, the Mo content (Mo)1 in the weld metal and the Mo content (Mo)2 in the base metal are regulated such that the difference between the both contents $\Delta Mo\,(=(Mo)1-(Mo)2)$ is 0.03% or more, and PCM is 0.30% or less, where PCM is defined as follows: $PCM=(C)+(Si)/30+(Mn)/20+(Cu)/20+(Ni)/60+(Cr)/20+(Mo)/15+(V)/10+5(B)$. Here, (M) denotes a content (weight %) of a component M in the weld metal.

On the other hand, a coating flux of the high cellulose type coated electrode contains relative to the total amount of the coating flux, 0.1 to 7.0% of MgO, 7 to 25% of iron oxides (in FeO equivalent), 8 to 19% of $TiO_2$, 10 to 30% of $SiO_2$ and 5 to 27% of Mn, and a core wire and/or the coating flux includes 0.06 to 1.10% of Mo relative to the total amount of the welding electrode. A ratio of the weight of the coating flux to the weight of the welding electrode being 0.10 to 0.19. By this, preferential corrosion resistance, toughness and crack resistance can be improved in the weld metal of a girth weld zone of a pipe which might be exposed in a corrosion environment containing $CO_2$.

6 Claims, 2 Drawing Sheets

GIRTH-WELDING PROCESS FOR A PIPE AND A HIGH CELLULOSE TYPE COATED ELECTRODE

BACKGROUND OF THE INVENTION

The present invention relates to a girth-welding process for a pipe and a high cellulose type coated electrode, which are suitable for coated arc welding of line pipes transporting $CO_2$-containing oil, $CO_2$-containing natural gas and $CO_2$ gas. More particularly, the present invention relates to a girth-welding technique in which the weld metal exhibits excellence in preferential corrosion resistance, cold toughness and crack resistance.

In prior art, there have been published following literatures for proposing improvement with respect to preferential corrosion in weld zone of low alloy steel.

(1) The difference of Ni-content between the base metal and the weld metal has an influence on the local corrosion in the welded joint in the icy sea. (Takashi Abe and others; "TETSU-TO-HAGANE (Journal of the Iron and Steel Institute of Japan)" Vol. 72, (1986), Page 1266).

(2) The difference of Ni- and Cu-contents between the base metal and the weld metal have an influence on the local corrosion of the weld zone of the steel used in the icy sea and the degree of preferential corrosion depends upon a value, i.e., $3.8Cu+1.1Ni+0.3$. (Kitaro Ito and others; "TETSU-TO-HAGANE" Vol. 72, (1986), p. 1265).

(3) A use of a low alloy welding rod containing Cu and Ni is effective in protecting a girth weld zone of a carbon steel pipe against preferential corrosion. (Hideaki Miyuki; "Zairyo (JOURNAL OF THE SOCIETY OF MATERIALS SCIENCE, JAPAN)" Vol. 38 (1989), No. 424, pp. 62–68).

(4) The Ni- and Mo-additives are effective in protecting a longitudinal seam weld zone of a welded steel pipe against preferential corrosion (Suga and others; Japanese Provisional Publication No.hei-3-170641/1991).

That is, for improving the preferential corrosion behavior of weld metal in an corrosion environment containing oxygen such as in the icy sea etc., the adding of Ni and Cu to the weld metal is proposed as an effective procedure, and the addition of Ni and Mo to the metal is presented for improving the preferential corrosion behavior in longitudinal seam weld zone of welded steel pipe.

Investigation, however has not yet been sufficiently made into inhibition of preferential corrosion in girth weld zone of line pipes for use in the corrosion environment containing $CO_2$. That is, when a welded steel pipe or a seamless steel pipe is used for transportation of $CO_2$-containing oil, $CO_2$-containing natural gas or $CO_2$ gas, there may sometimes occur preferential corrosion in weld zone such that a girth weld metal is preferentially corroded. This is because that there is difference in chemical composition and metallographic microstructure between the weld metal and the base metal, so that the weld metal portion is electro-chemically less noble and thus preferentially corroded.

In the prior art girth welding of the line pipes used in such the corrosion environment, neither method of girth welding nor high cellulose type welding rod has not been proposed with considering preferential corrosion, weldability and mechanical properties. In other word, if improved protection against preferential corrosion is aimed by adding Cu and/or Ni when a high cellulose type coated electrode is used, it is necessary to take account of weld cracks and mechanical properties of the weld metal. In spite of this situation, no high cellulose type coated electrode has been presented with considering the weld cracks and mechanical properties of the weld metal. In this connection, Japanese Provisional Publication No.sho-63-220994/1988 states that addition of Mo improves the mechanical properties, but there is no disclosure of the practical addition range, or the influence of the Mo addition upon the hot crack resistance and cold crack resistance.

It has been found that addition of Mo and Ni is effective to prevent a longitudinal seam weld zone from being preferentially corroded, but it has not been considered whether or not the addition of Mo functions as an inhibitor of the preferential corrosion around a girth weld zone. And no high cellulose type coated electrode with Mo added has been developed in view of practical use, with taking into account of the hardness and crack resistance of the weld metal.

In the practical environment in which line pipes are used, however, there often occur problems of the preferential corrosion caused by $CO_2$. Therefore, it is strongly desired to develop a useful girth-welding process for a pipe and a high cellulose type coated electrode in order to improve the resistance to preferential corrosion, weldability and mechanical properties etc. in girth weld zone.

SUMMARY OF THE INVENTION

It is therefore an object of the present invention to provide a girth-welding process for a pipe and a high cellulose type coated electrode for use in the process which allows the girth weld metal to have a sufficient strength, toughness, crack resistance with preferential corrosion resistance A girth-welding process for a pipe according to the present invention produces a weld zone composed of a weld metal containing, by weight %, 0.05 to 0.20% of C, 0.05 to 0.45% of Si, 0.50 to 2.00% of Mn and 0.03 to 1.05% of Mo, and having Fe and inevitable impurities for the balance. Here, the content of impurities are limited to a predetermined range as follows; 0.030% or less of P, 0.030% or less of S, 0.10% or less of Al, 0.050% or less of N, 0.10% or less of Nb, 0.10% or less of V, 0.10% or less of Ti, 1.00% or less of Cr, 0.0025% or less of Ca, 0.10% or less of O, and 0.05% or less of Zr.

The weld metal is regulated such that the difference between the Mo content (Mo)1 in the weld metal and the Mo content (Mo)2 in a base metal, that is $\Delta Mo$ $(=(Mo)1-(Mo)2)$ is 0.03% or more, and PCM is 0.30% or less, where PCM is defined as the following expression: $PCM=(C)(Si)/30+(Mn)/20+(Cu)/20+(Ni)/60+(Cr)/20+(Mo)/15+(V)/10+5(B)$. Here, (M) denotes a content (weight %) of a component M in the weld metal. The weld metal further contains 0.15 to 2.00% of Cu+Ni and/or 0.0005 to 0.0050% of B.

The process according to the present invention prepares a welded pipe having the weld metal made of the aforementioned composition by metal arc welding with coated electrode. The pipe is prepared by welding a base metal containing, by weight %, 0.03 to 0.15% of C, 0.05 to 0.50% of Si, 0.50% to 2.00% of Mn and 0.005 to 0.10% of Al, and having Fe and inevitable impurities for the balance, using a high cellulose type coated electrode which is described hereinafter, on welding condition that the core wire of the electrode is 3.2 to 4.8 mm in diameter, the current used is DCEP (direct current electrode positive), the welding current is within 90 to 240A, the welding speed is 100 to 450 mm/min and the welding is effected in all position downward welding.

The above base metal may further contain at least one component selected from the group of 0.05 to 2.0% of Cu, 0.05 to 2.0% of Ni, 0.05 to 2.0% of Cr, 0.05 to 1.0% of Mo, 0.005 to 0.20% of Nb, 0.005 to 0.20% of V, 0.005 to 0.20% of Ti, 0.0005 to 0.0020% of B and 0.0005 to 0.0050% of Ca.

On the other hand, a high cellulose type coated welding electrode of the present invention comprises a core wire made of a mild steel or a low alloy steel, and a coating flux being prepared by kneading a coating flux starting material containing cellulose with a binder and applied to the peripheral surface of the core wire. The above coating flux contains relative to the total amount of the coating flux, 0.1 to 7.0% of MgO, 7 to 25% of iron oxides (in FeO equivalent), 8 to 19% of $TiO_2$, 10 to 30% of $SiO_2$ and 5 to 27% of Mn, and the coating flux and/or the core wire includes 0.06 to 1.10% of Mo relative to the total amount of the welding electrode, with a ratio of the weight of the coating flux to the weight of the welding electrode being 0.10 to 0.19.

In the high cellulose type coated electrode, the core wire and/or the coating flux may further contains 0.30 to 2.00% of Cu+Ni relative to the total amount of the welding electrode. Also, the coating flux may further contains 0.05 to 0.5% of B relative to the total amount of the coating flux.

DESCRIPTION OF THE PREFERRED EMBODIMENTS

The present invention is to develop a welding process for forming a girth weld metal excellent in preferential corrosion resistance and crack resistance and having a high strength and a high toughness, and a high cellulose type coated electrode for use in that process. In order to achieve this, a lot of various experiments were carried out. Those experiments include measurement of the weld zone on preferential corrosion behavior etc. by changing the compositions of weld metal, base metal and welding electrode, and the welding conditions. The present invention has been achieved based on such experiments and studies.

The present invention will be described specifically hereinafter.

Weld metal

At first, there will be described the reasons for specifying the components and compositions of weld metals obtained.

C; 0.05 to 0.20%

C content serves to assure good workability and mechanical properties of a weld metal and is specified with in 0.05 to 0.20% in the weld metal. In a range of the cellulose content in a high cellulose type coated electrode with which welding can be carried out in good workability, the weld metal includes a 0.05% or more carbon content. On the other hand, if the carbon content is less than 0.05%, the welding workability is markedly lowered. The carbon content in excess of 0.20% raises the strength and hardness of a weld metal and thereby the weld metal is liable to cause cold cracks.

Si; 0.05 to 0.45%

Si content serves to assure good workability and mechanical properties of a weld metal and is specified within 0.05 to 0.45% in the weld metal. The Si content of less than 0.05% causing shortage of deoxidization, increases an oxygen amount in the weld metal, to thereby exhibit poor mechanical properties. When Si is added to the weld metal more than 0.45%, a more slug arises, and this makes the welding difficult.

Mn; 0.50 to 2.00%

Mn content also serves to assure good workability and mechanical properties of a weld metal and is specified within 0.50 to 2.00% in the weld metal. The Mn content of less than 0.50% causing shortage of deoxidization, resulting in poor mechanical properties. Addition of Mn to the weld metal in excess of 2.00% causes pits to readily arise on the bead surface.

Mo; 0.03 to 1.05%

Figure 1:
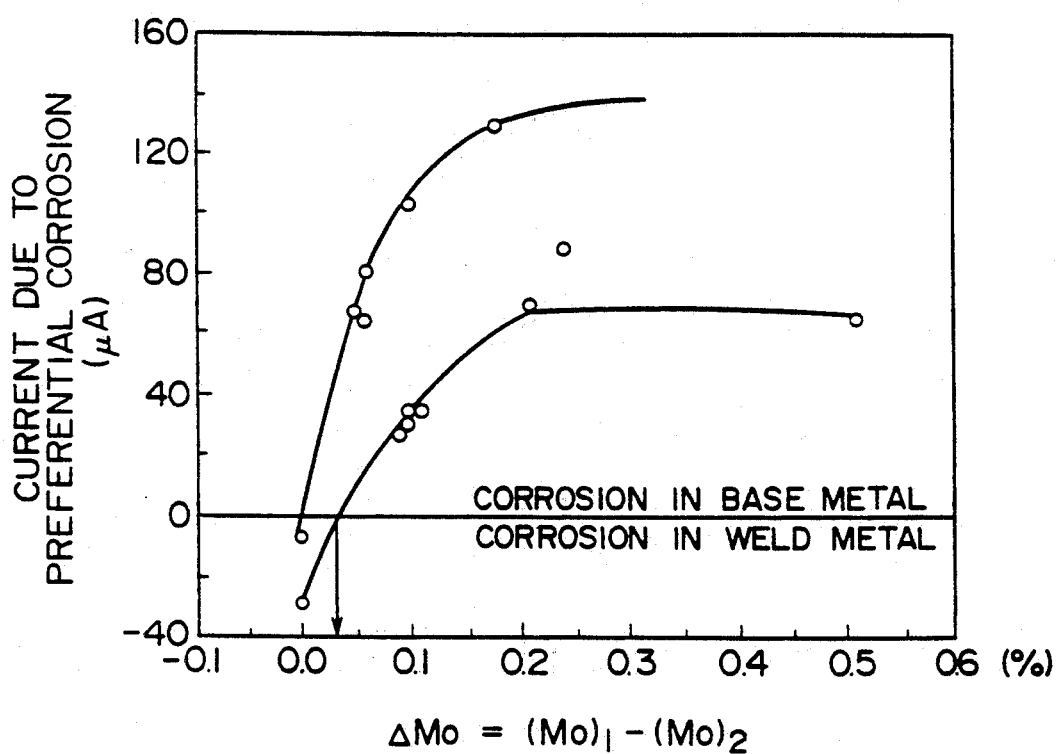
FIG. 1 is a plot showing relationships between a difference $\Delta Mo=(Mo)1-(Mo)2$ and a preferential corrosion current ($\mu A$) between a base metal and a weld metal, where $(Mo)1$ is Mo content in the weld metal, whereas $(Mo)2$ is Mo content in the base metal.

Mo content serves to protect a weld metal against preferential corrosion, is added to the weld metal within 0.03 to 1.05% such that $\Delta Mo$ is equal to or more than 0.03%. Here, $\Delta Mo=(Mo)1-(Mo)2$, where $(Mo)1$ is the Mo content in the weld metal, and $(Mo)2$ is the Mo content in the base metal. As shown in FIG. 1, when the difference of the Mo content between the weld metal and the base metal is equal to or more than 0.03%, it is possible to prevent the weld metal in a $CO_2$ corrosion environment from being preferentially corroded. Addition of Mo in excess of 1.05%, however, makes the weld metal hard and weld cracks (cold cracks) tend to occur. Here, FIG. 1 is a plot showing an influence of $\Delta Mo$ upon the preferential corrosion characteristic, and an axis of ordinate is taken to be a preferential corrosion current ($\mu A$) flown between the base metal and the weld metal, whereas an axis of abscissa denotes $\Delta Mo$ (%). For the preferential corrosion current positive, no preferential corrosion will occur in a weld metal. When $\Delta Mo$ is equal to or more than 0.03%, the preferential corrosion current turns into positive.

A weld metal having a composition stated above further contains Cu and Ni in a total amount of 0.15 to 2.00% and/or 0.0005 to 0.0050% of B.

Cu+Ni; 0.15 to 2.00%

The Cu and Ni content serves to improve the toughness and the preferential corrosion characteristic of a weld metal. The content can be added alone or in combination. Cu and/or Ni is added in a total amount of 0.15 to 2.00%. When the total amount of the content is less than 0.15%, the effect thereof is not recognized, whereas the addition of the content in excess of 2.00% results in a tendency to cause the solidification crack in the weld metal. Although the addition of Cu and Ni to the weld metal has also an effect to prevent the weld metal from being preferentially corroded, the effect due to these element is smaller than that of Mo. Therefore they play a supplemental role so that the addition is optional. However, if Cu and Ni are added to a base metal, it is effective to add them as much as added to the base metal.

B; 0.0005 to 0.0050%

In a case where a weld metal is desired to have cold toughness, B can be added within 0.0005 to 0.0050% in the weld metal. The B content less than 0.0005% has little effect on the improvement of the toughness, whereas the content in excess of 0.0050% makes the hardness of the weld metal so high that cold cracks tends to occur easily.

PCM; 0.30% or less

The PCM of the weld metal in excess of 0.30% causes the raise of hardness and strength of weld metal so that cold cracks and stress corrosion cracks tends to occur easily in the weld metal.

Inevitable impurities of P, S, Al, N, Nb, V, Ti, Cr, Ca, O, Zr

If the content of these impurities exceeds the aforementioned range, defects such as blowhole (in the case of N), hot crack (in the case of P and S), and cold crack (in the case of Nb, V, Cr) occur in the weld metal. Also, mechanical properties of the weld metal are degraded (in the case of P, Al, Nb, V, Ti, Ca, O, Zr).

Next, the reasons will be described for specifying the chemical compositions of a steel base metal. The essential added elements at first will be explained.

C; 0.03 to 0.15%

A carbon content in a steel is an effective element to improve the strength of the steel, though an excessive addition might bring about deterioration of the toughness. Accordingly, the upper limit of the carbon content is defined to be 0.15% in order to prepare a steel pipe excellent in strength and toughness. Reduction of the carbon content improves the toughness, but the carbon content of less than 0.03% lowers the toughness. Further, in order to obtain a stable precipitation hardening effect by Nb, V, Ti etc. and make the best of the effect, the base metal needs at least 0.03% carbon content. As a result, the lower limit of the carbon content is defined to be 0.03%.

Si; 0.05 to 0.50%

Si is needed for deoxidation, but excessive addition of it deteriorates the toughness. Accordingly, the lower limit and upper limit are defined to be 0.05% and 0.50% respectively.

Mn; 0.50 to 2.00%

Mn is needed 0.50% or more for deoxidization, but an excess of Mn over 2.00% lowers the weldability, so that the upper limit of Mn is defined to be 2.00%.

Al; 0.005 to 0.10%

Al is required for deoxidization. The Al content of less than 0.005% exhibits a poor deoxidization, so that the lower limit of Al is defined to be 0.005%. On the other hand, an excess of Al over 0.10% lowers the cleanliness of the steel and the toughness in the heat affected zone (to be referred to as HAZ), so that the upper limit of Al is defined to be 0.10%.

Next description will be made of optionally added components to the base metal.

Cu; 0.05 to 2.0%

Ni; 0.05 to 2.0%

Both Cu and Ni contents improve a base metal in strength and toughness without exerting an adverse effect upon the HAZ toughness. The improvement of the base metal in strength and toughness by these contents is small when each content is less than 0.05%. An excess of each content over 2.0% has an adverse effect on the hardness and toughness in the HAZ, so that the upper limit is defined to be 2.0%.

Cr; 0.05 to 2.0%

Cr functions to enforce the strength of a base metal and the weld zone. But an excessive content of Cr over 2.0% increases the hardness and lowers the toughness in the HAZ. Therefore, the upper limit is defined to be 2.0%.

Mo; 0.05 to 1.0%

Mo improves a base metal in strength and toughness, but an excessive content of Mo over 1.0% increases the hardness in the HAZ, and thus deteriorates the weldability. Accordingly the upper limit is defined to be 1.0%.

The lower limit for each content of these elements heretofore is defined to be 0.05%, which is a minimum amount required for obtaining a corresponding effect.

Ti; 0.005 to 0.20%

Ti addition of 0.005% or more has an effect to prevent austenite grains from becoming coarse, so that the lower limit of Ti is defined to be 0.005%. An excessive amount of Ti added lowers the toughness of the weld zone, so that the upper limit of Ti is defined to be 0.20%.

Nb; 0.005 to 0.20%

V; 0.005 to 0.20%

Nb as well as V has an effect upon the strength and toughness, but an excessive content of either of these elements over 0.20% lowers a base metal and the weld zone in toughness, so that the upper limit is defined to be 0.20%. The lower limit is to be 0.005% above which the improvement of the material is observed.

B; 0.0005 to 0.0020%

B is effective for improving the strength of a base metal, but an excessive addition brings about deterioration of weldability and toughness in the HAZ. Accordingly, the upper limit is defined to be 0.0020%. The lower limit is to be 0.0005% above which the improvement of the strength is observed.

Ca; 0.0005 to 0.0050%

Addition of Ca improves the resistance to hydrogen induced crack. The lower limit is defined to be 0.0005%, above which the effect is recognized. An excessive addition of Ca is harmful resulting in formation of oxides, so that the upper limit is defined to be 0.0050%.

Welding Electrode

Now, there will be followed description of the reasons for restricting chemical compositions and a coating ratio of a high cellulose type coated electrode of the present invention.

The high cellulose type coated electrode according to the present invention comprises a core wire made of mild steel or low alloy steel having a coating flux applied on its peripheral surface, the coating flux which is obtained by kneading a starting material for the coating flux with a binder.

MgO, iron oxide, $TiO_2$, $SiO_2$ and Mn are included in the above coating flux, which may include B optionally. On the other hand, Mo is added to the above coating flux, and/or Mo is contained in the above core wire as a constituent thereof. Further, both Cu and Ni may be added to the above coating flux and/or the core wire. Each quantity of the additives which are added only to the coating flux is represented by a weight % relative to the total weight of the coating flux, whereas each quantity of the additives which may be added to any of the coating flux and the core wire is represented by a weight % relative to the total weight of the welding electrode. The reasons for restricting the composition will be described hereinafter.

MgO:0.1 to 7.0% (relative to the total weight of the coating flux)

MgO content prevents the weld metal from dropping even when the welding speed is changed sharply, and has an effect to improve pit resistance and X-ray performance in the joint. However, the effect is not observed for the content of less than 0.1%, whereas the content in excess of 7.0% gives the slug too large a fluidity, thus making it difficult to weld downward. As a result, the amount of MgO is to be within 0.1 to 7.0% relative to the total weight of the coating agent.

Iron oxide (in FeO equivalent):7 to 25% (relative to the total weight of the coating flux)

Iron oxide serves to make the slug porous thus improving the slug removability, and has an effect to prevent occurrence of pits due to excessive deoxidation. No such effects, however, can be obtained when the iron content is less than 7%. On the other hand, the content in excess of 25% gives the slug too large a fluidity, thus making it difficult to weld downward. Accordingly, the amount of iron oxide is to be within 7 to 25% in FeO equivalent relative to the total weight of the coating flux. Iron oxide can be added in a form of $Fe_2O_3$ in place of FeO. In this case, the amount of iron oxide in FeO equivalent is adapted to fall within the above range.

$TiO_2$:8 to 19% (relative to the total weight of the coating flux)

$TiO_2$ has an effect to stabilize the arc. The arc cannot be stabilized when the $TiO_2$ content is less than 8%. The content in excess of 19% lowers the arc force, to make it difficult to weld downward. Accordingly, the amount of $TiO_2$ is to be within 8 to 19% relative to the total weight of the coating agent.

$SiO_2$:10 to 30% (relative to the total weight of the coating flux)

$SiO_2$ is an essential component for improving the arc force, expansion and conformability of molten metal. But the effect cannot obtained when the content is less than 10%, whereas the content in excess of 30% makes the amount of slug large, gives the slug too large fluidity, thus making it difficult to weld downward. Accordingly, the amount of $SiO_2$ is to be within 10 to 30% relative to the total weight of the coating flux. It should be noted that $SiO_2$ can be added in a form of glass, silica minerals and the like.

Mn:5 to 27% (relative to the total weight of the coating flux)

Mn is an essential component as a deoxidizer and for ensuring the strength and toughness. If the content is less than 5%, it is impossible to obtain a clean weld metal due to the shortage of deoxidization. If the content is more than 27%, an excessive deoxidization occurs, causing pits to arise easily on the bead surface. Accordingly, the amount of Mn is to be within 5 to 27% relative to the total weight of the coating flux. In place of Mn metal, Mn can be added in a form of Fe-Mn alloy or Mn oxides. Here, in the latter case, the amount in Mn equivalent is adapted to fall within the above range.

Mo:0.06 to 1.10% (relative to the total weight of the welding electrode)

Mo is added for the purpose of adjusting the strength of the weld metal and improving the resistance to preferential corrosion. When the content is less than 0.06%, no good resistance to preferential corrosion cannot be obtained. On the other hand, when the content exceeds 1.10%, the weld metal is too much hardened, to thereby liable to cause cold cracks (delayed cracks due to hydrogen). Accordingly, the amount of Mo is to be within 0.06 to 1.10% relative to the total weight of the welding electrode. Mo may be added to the coating agent in a form of Mo metal, Fe-Mo alloy or etc. It is also possible to add Mo to the core wire.

Figure 2:
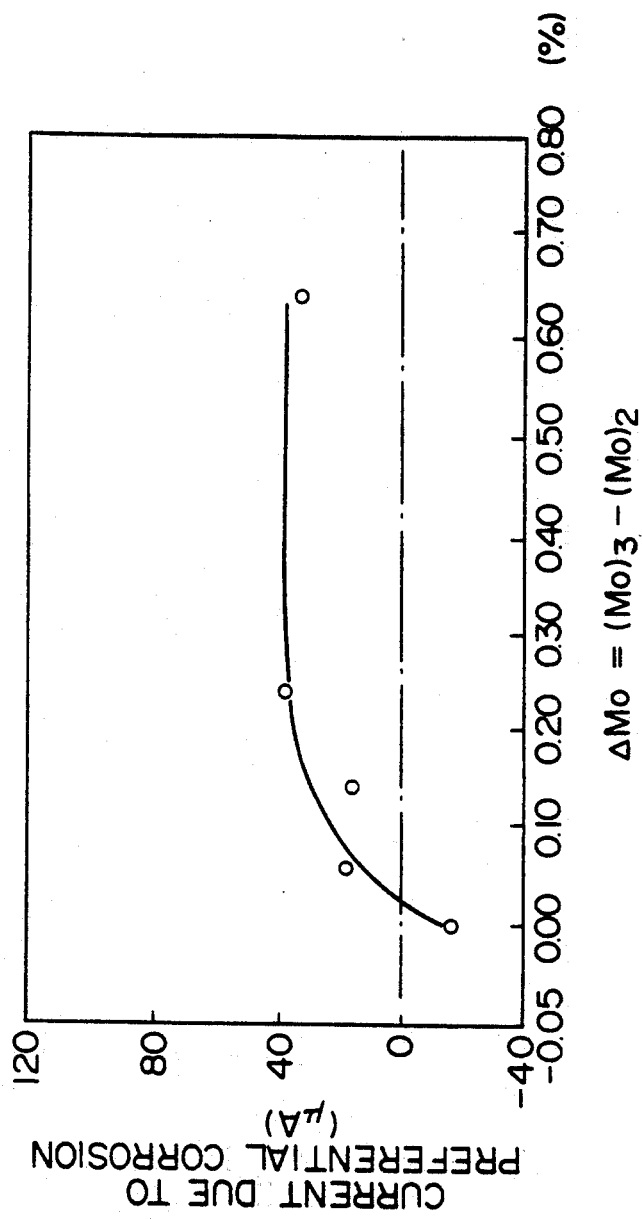
FIG. 2 is a plot showing relationships between a difference $\Delta Mo=(Mo)3-(Mo)2$ and a preferential corrosion current ($\mu A$) between a base metal and a weld metal, where $(Mo)3$ is Mo content in the welding electrode (the content relative to the total weight of the welding electrode), whereas $(Mo)2$ is Mo content in the base metal.

Further, in order to provide a better resistance to preferential corrosion in the weld zone, the ratio of Mo to the total weight of the welding electrode is preferably set to be more than Mo content (%) in the base metal plus 0.06%. FIG. 2 is a plot showing relationships between a difference $\Delta Mo=(Mo)3-(Mo)2$ (i.e. the difference between the Mo content (Mo)3 in the welding electrode (relative to the total weight of the welding electrode) and the Mo content (Mo)2 in the base metal) and a preferential corrosion current ($\mu A$) between the base metal and the weld metal. When the preferential corrosion current is positive, the preferential corrosion of the weld metal will not occur. If $\Delta Mo$ is 0.06% or more, the preferential corrosion current turns into positive.

The welding electrode essentially contains the components described above, and it may optionally contains, as required, Cu+Ni component and/or B component in proper amounts.

Cu+Ni:0.30 to 2.00% (relative to the total weight of the welding electrode)

Cu and Ni may be added in order to improve the preferential corrosion resistance of the weld metal. For the purpose of obtaining this effect, the content in total of Cu and Ni is to be 0.30 to 2.00% relative to the total weight of the welding electrode. When the content in total of Cu and Ni is less than 0.30%, the effect upon the preferential corrosion resistance cannot be obtained. If the content is more than 2.00%, solidification crack disadvantageously tends to occur in the weld metal. Cu and Ni can be added to the coating flux in a form of Cu metal or copper oxide, and Ni metal, Fe-Ni alloy or nickel oxide, respectively. Cu and Ni may be also added to the core wire.

B:0.05 to 0.5% (relative to the total weight of the coating flux)

B may be added in order to refine the microstructure and achieve good toughness. When the content is less than 0.05%, the effect to improve the impact performance is small. The content in excess of 0.5% makes the weld metal hard, readily causing cold cracks. Accordingly, the B content relative to the total weight of the coating flux is to be within 0.05 to 0.5%.

The remaining part of the coating flux mainly consists of cellulose including a binder. Further, the coating flux may contain in small amounts metal components such as Fe, Cr etc. and other components such as, for example, $Na_2O$, $Al_2O_3$, $ZrO_2$, $K_2O$ etc., which are normally added to the coating flux of a high cellulose type coated electrode.

Weight ratio of the coating flux:0.10 to 0.19 (relative to the total weight of the welding electrode)

A ratio (coating ratio) of the weight of the coating flux to that of the welding electrode is a significant factor for effecting a downward welding, and in order to facilitate the downward welding, the coating ratio should be equal to 0.10 or more. When the coating ratio is less than 0.10%, the function of the coating flux as a protecting tube is not enough to stabilize the arc, and moreover, the electrode tends to be burned rapidly. On the other hand, when the coating ratio is more than 0.19, the concentration of the arc is lowered, and this makes it difficult to form back beads. Moreover, the arc is weakened in the second layer welding and thereafter and to make matters worse, the amount of slug is increased. Accordingly, the coating ratio is to be within 0.10 to 0.19.

As for a core wire, a mild steel-cored wire or a low alloy steel-cored wire may be used. It is needless to say that there is no limitation on the component and composition of these steels.

The high cellulose type coated electrode of the present invention can be applied to welding various kinds of steels. The electrode of the present invention is particularly suitable for girth-welding of steel pipes and can exhibit a remarkable effect of preventing preferential corrosion upon a girth weld zone of steel pipes comprising 2.00% or less of Cu, 2.00% or less of Ni, 1.00% or less of Mo, 1.00% or less of alloy elements other than Cu, Ni, Mo, and Mn, and the rest part consisting of iron and inevitable impurities. [Welding condition]

Welding conditions in the present invention is limited by the following reasons.

Electrode diameter:3.2 to 4.8 mm

In view of efficiency of welding and workability of girth welding of pipes, the electrode diameter is specified within 3.2 to 4.8 mm, although welding may be carried out using an electrode having a diameter other than this range.

Kinds of electric current:DCEP (Direct Current Electrode Positive)

The DCEP (direct current electrode positive) is to be used as is normally used when a high cellulose type welding electrode is employed.

Welding current, welding speed:90 to 240A, 100 to 450 mm/min, respectively

The generally used welding current and welding speed is to be employed in accordance with a groove shape, welding position and electrode diameter.

Welding position:all position

Since a girth welding of pipes is to be made, welding is to be effected in all position. In a case of inclined welding, a downward welding is to be carried out.

Examples

Examples of the present invention will be detailed next as compared with the comparative examples.

Table.1 shows chemical compositions (weight %) of testing base metals. Each of steels A to D shown in Table.1, was formed into a welded steel pipe with 38 inch in outer diameter and 12 m long. All the welded steel pipes were girth-welded by manual arc welding, and thus prepared pipes were subjected to measurements on strength and toughness of weld metal, and preferential corrosion rate in the seawater environment (with $CO_2$ bubbling).

Table.2 shows chemical composition and welding conditions and Table.4 shows preferential corrosion rate, strength, toughness and occurrence of cracks with respect to each weld metal. In Table.2, welding electrodes E1 to E13 have respective compositions and coating ratios etc. shown in Table.3. The strength YS was evaluated using a specimen specified by JIS Z2201 No. 3(6 mm diameter), whereas the toughness was evaluated based on the absorption energy at 0° C. using a specimen specified by JIS Z3128 No. 4. The occurrence of weld cracks was determined by observation of five cross-sections of the pipe after welding. For the measurement of the preferential corrosion rate, a steel pipe of 50 cm long having a girth-weld zone was employed. That is, the steel pipe was filled with a synthetic seawater, into which $CO_2$ gas was blown. After this, the difference in wall thickness between the base metal and the weld metal portion was measured to determine a preferential corrosion rate.

As shown in Tables.2 and 4, with respect to all the girth-weld zone examples in which chemical composition of the weld metal satisfies the scope of the claims, the following facts were confirmed. That is, they are all excellent in yield strength ($350N/mm^2$ or more) and toughness (50 J or more), having excellent preferential corrosion behavior (represented by 0 mm/y in column "preferential corrosion rate" of Table.4, which indicates that no weld metal portion is corroded preferentially), low hardness (not more than Hv 300) and excellent crack resistance. As a result these girth-weld zone were confirmed to be excellent.

As is detailed above, according to the present invention, the chemical component of the weld metal portion is regulated by the base metal, weld material and welding process. Therefore, even in a case where the girth weld zone is exposed in a corrosion environment causing preferential corrosion such as a seawater environment containing $CO_2$, it is possible to provide a girth weld metal portion which has a sufficient strength and a high toughness and is excellent in weld crack resistance and preferential corrosion resistance, by specifying the difference of Mo content between the base metal and the weld metal portion as stated above.

Fifteen welded steel pipes each having an outer diameter of 38 inch with 12 m long were prepared from the testing steel having a composition shown in Table.5. Each pipe was girth-welded with a high cellulose type welding electrode having a composition in accordance with Table.6. In the welding, welding rods of 4.0 mm (for first and second two layers) and 4.8 mm (for third to final layers) in diameter were used, and the welding was effected with a welding current ranging from 100 to 240 A. After welding, each weld metal of the thus prepared pipes was investigated into strength, toughness, weld crack and preferential corrosion rate in the seawater environment (with $CO_2$ bubbling). The resultant is shown in Table.7.

The yield strength was evaluated using a specimen specified by JIS Z 2201 No. 3(6 mm diameter), whereas the toughness was evaluated based on the absorption energy at 0° C. using a specimen specified by JIS Z 3128 No. 4. The occurrence of weld cracks was determined by observation of five cross-sections of the pipe after welding. For the measurement of the preferential corrosion rate, a steel pipe of 50 cm long having a girth-weld zone was employed. That is, the steel pipe was filled with synthetic seawater, into which $CO_2$ gas was blown. After this, the difference in wall thickness between the base metal and the weld metal portion was measured to determine a preferential corrosion rate. A weld metal portion which was not preferentially corroded was represented by 0.0 mm/y in column "preferential corrosion rate".

As described in detail heretofore, if a welding is executed with a high cellulose type welding electrode of the present invention, it is possible to obtain a weld metal portion having a sufficient strength and a high toughness and being excellent in weld crack resistance and preferential corrosion resistance. Particularly, it is possible to obtain a girth weld metal portion hard to be preferential corroded relative to the base metal and thereby suitable for welding line pipes for transporting corrosive oil and natural gas.

TABLE 1

| Steel | Chemical composition of testing base metals (by weight %) | | | | | | | | | | | |
|---|---|---|---|---|---|---|---|---|---|---|---|---|
| | C | Si | Mn | Cu | Ni | Cr | Mo | Nb | V | Ti | Al | B | Ca |
| A | 0.05 | 0.29 | 1.50 | 0.22 | 0.25 | — | — | 0.020 | 0.020 | 0.010 | 0.050 | — | 0.0020 |
| B | 0.04 | 0.25 | 1.20 | — | — | 0.20 | — | 0.050 | 0.066 | 0.012 | 0.036 | — | — |
| C | 0.03 | 0.33 | 1.60 | 0.30 | 0.12 | — | — | 0.043 | 0.033 | 0.020 | 0.045 | 0.0008 | — |
| D | 0.06 | 0.35 | 1.80 | 0.21 | 0.41 | — | 0.18 | 0.033 | 0.075 | 0.009 | 0.050 | — | — |

TABLE 2

| No. | Steel | Electrode | C | Si | Mn | Mo | ΔMo | Cu | Ni | Cu + Ni | B | PCM | Rod-diameter | Current (A) | Voltage (V) | Welding speed (mm/min) |
|---|---|---|---|---|---|---|---|---|---|---|---|---|---|---|---|---|
| 1 | A | E1 | 0.10 | 0.35 | 1.35 | 0.04 | 0.04 | 0.11 | 0.12 | 0.23 | — | 0.19 | 4.0 4.8 | 160 to 210 | 24 to 32 | 150 to 310 |
| 2 | A | E2 | 0.11 | 0.35 | 1.40 | 0.05 | 0.05 | 0.35 | 0.12 | 0.47 | — | 0.22 | 3.2 4.0 4.8 | 100 to 200 | 25 to 31 | 100 to 230 |
| 3 | A | E3 | 0.09 | 0.30 | 1.20 | 0.10 | 0.10 | 0.25 | 0.40 | 0.65 | — | 0.19 | 4.0 4.8 | 170 to 210 | 24 to 32 | 160 to 320 |
| 4 | A | E4 | 0.12 | 0.40 | 1.35 | 0.25 | 0.25 | 0.10 | 0.08 | 0.18 | 0.0025 | 0.24 | 4.0 4.8 | 170 to 230 | 23 to 33 | 130 to 370 |
| 5 | A | E5 | 0.24 | 0.40 | 1.25 | 0.03 | 0.03 | 0.12 | 0.11 | 0.23 | — | 0.33 | 3.2 4.0 | 100 to 220 | 23 to 27 | 110 to 420 |
| 6 | A | E6 | 0.13 | 0.40 | 1.25 | — | 0.00 | 0.11 | 0.14 | 0.25 | — | 0.21 | 4.0 4.8 | 150 to 200 | 24 to 32 | 130 to 400 |
| 7 | A | E7 | 0.10 | 0.35 | 1.30 | 0.06 | 0.06 | 0.12 | 2.28 | 2.40 | — | 0.27 | 4.0 4.8 | 150 to 220 | 23 to 30 | 140 to 370 |
| 8 | B | E8 | 0.09 | 0.35 | 1.30 | 0.10 | 0.10 | — | — | — | — | 0.17 | 4.0 4.8 | 170 to 220 | 23 to 31 | 150 to 320 |
| 9 | B | E6 | 0.10 | 0.40 | 1.25 | — | 0.00 | — | — | — | — | 0.18 | 3.2 4.0 | 90 to 210 | 22 to 25 | 110 to 350 |
| 10 | C | E9 | 0.15 | 0.35 | 1.30 | 0.15 | 0.15 | 0.18 | 0.05 | 0.23 | 0.0010 | 0.25 | 4.0 4.8 | 160 to 210 | 24 to 32 | 150 to 310 |
| 11 | C | E13 | 0.12 | 0.40 | 1.15 | — | 0.00 | 0.15 | 0.08 | 0.23 | 0.0010 | 0.20 | 4.0 4.8 | 150 to 240 | 24 to 32 | 140 to 310 |
| 12 | D | E10 | 0.09 | 0.25 | 1.15 | 0.25 | 0.07 | 0.10 | 0.30 | 0.40 | — | 0.18 | 3.2 4.0 4.8 | 90 to 220 | 24 to 31 | 110 to 380 |
| 13 | D | E11 | 0.12 | 0.15 | 1.27 | 0.39 | 0.21 | 0.08 | 0.16 | 0.24 | — | 0.22 | 4.0 4.8 | 150 to 220 | 23 to 31 | 140 to 330 |
| 14 | C | E12 | 0.12 | 0.22 | 1.30 | 0.52 | 0.52 | — | — | — | — | 0.23 | 4.0 4.8 | 150 to 220 | 23 to 31 | 150 to 400 |

TABLE 3

| Code | Ratio in coating flux (wt. %) | | | | | | | | | Ratio to the total weight of welding electrode (wt. %) | | | Coating ratio wt. % | Remark |
|---|---|---|---|---|---|---|---|---|---|---|---|---|---|---|
| | Cellulose | FeO | TiO$_2$ | SiO$_2$ | Mn | MgO | B | Na$_2$O | Others | Cu | Ni | Mo | | |
| E1 | 33.3 | 22.0 | 10.2 | 12.5 | 7.8 | 5.5 | — | 4.8 | 3.9 | — | — | 0.07① | 14 | Example |
| E2 | 27.8 | 15.3 | 17.2 | 13.1 | 13.9 | 2.0 | — | 4.7 | 6.0 | 0.43① | — | 0.10② | 14 | Example |
| E3 | 29.3 | 15.2 | 14.2 | 13.4 | 13.6 | 1.4 | — | 4.4 | 8.5 | 0.25① | 0.47① | 0.14① | 18 | Example |
| E4 | 31.3 | 17.2 | 14.2 | 14.5 | 13.6 | 2.3 | 0.18 | 4.4 | 2.3 | 0.04① | — | 0.35① | 14 | Example |
| E5 | 28.5 | 16.2 | 12.2 | 12.5 | 13.0 | 2.3 | — | 4.4 | 10.9 | 0.06① | 0.04① | 0.06① | 14 | Comparative Example |
| E6 | 31.3 | 17.2 | 12.2 | 14.5 | 13.6 | 2.3 | — | 4.4 | 4.4 | — | — | — | 14 | Comparative Example |
| E7 | 24.1 | 8.2 | 10.5 | 13.4 | 13.6 | 1.4 | — | 3.8 | 25.0 | — | 3.90① | 0.10② | 17 | Comparative Example |
| E8 | 24.5 | 13.5 | 11.4 | 12.7 | 24.7 | 1.5 | — | 4.3 | 7.3 | — | — | 0.14① | 18 | Example |
| E9 | 27.2 | 11.7 | 14.5 | 23.1 | 13.6 | 0.9 | 0.07 | 4.8 | 4.2 | 0.09① | — | 0.25① | 11 | Example |
| E10 | 27.5 | 11.0 | 11.4 | 22.7 | 13.1 | 5.0 | — | 4.5 | 4.8 | — | 0.17① | 0.28① | 14 | Example |
| E11 | 27.3 | 8.5 | 17.1 | 24.4 | 9.2 | 6.7 | — | 3.5 | 3.3 | — | — | 0.50② | 14 | Example |
| E12 | 27.5 | 11.0 | 12.4 | 22.7 | 13.1 | 5.0 | — | 4.5 | 5.3 | — | — | 0.75① | 14 | Example |
| E13 | 31.3 | 17.2 | 12.2 | 14.5 | 13.6 | 2.3 | 0.08 | 4.4 | 4.4 | 0.04① | — | — | 14 | Comparative Example |

(Note. 1) Na$_2$O is contained as a main component of caking additive.
(Note. 2) "Others" are components included in a trace such as Cu, Ni, Mo, Fe, Al$_2$O$_3$, ZrO$_2$, K$_2$O etc.
(Note. 3) ① indicates the addition to the coating flux and ② indicates the addition to the core wire.

TABLE 4

| No. | Preferential corrosion rate (mm/y) | Yield strength (M/mm²) | Absorption energy (J) | Weld metal hardness (Hv 10 kgf) | Solidification crack | Cold crack | Evaluation | Remark |
|---|---|---|---|---|---|---|---|---|
| 1 | 0 | 508 | 103 | 220 | Good | Good | Good | Example |
| 2 | 0 | 535 | 120 | 235 | Good | Good | Good | Example |
| 3 | 0 | 578 | 115 | 215 | Good | Good | Good | Example |
| 4 | 0 | 588 | 140 | 250 | Good | Good | Good | Example |
| 5 | 0 | 700 | 30 | 320 | Good | Bad | Bad | Comparative Example |
| 6 | 0.20 | 485 | 80 | 235 | Good | Good | Bad | Comparative Example |
| 7 | 0 | 521 | 105 | 220 | Bad | Good | Bad | Comparative Example |
| 8 | 0 | 505 | 98 | 205 | Good | Good | Good | Example |
| 9 | 0.60 | 478 | 88 | 200 | Good | Good | Bad | Comparative Example |
| 10 | 0 | 568 | 120 | 245 | Good | Good | Good | Example |
| 11 | 0.55 | 543 | 133 | 220 | Good | Good | Bad | Comparative Example |
| 12 | 0 | 508 | 105 | 210 | Good | Good | Good | Example |
| 13 | 0 | 579 | 87 | 232 | Good | Good | Good | Example |
| 14 | 0 | 598 | 92 | 244 | Good | Good | Good | Example |

TABLE 5

| Chemical composition of test steel (wt %) | | | | | | | | Mechanical characteristics | |
|---|---|---|---|---|---|---|---|---|---|
| C | Si | Mn | P | S | Cu | Ni | Mo | Yield strength (N/mm²) | Absorption energy (J) |
| 0.05 | 0.29 | 1.50 | 0.006 | 0.006 | 0.22 | 0.25 | trace | 508 | 350 |

TABLE 6

| Code | Cellulose | FeO | TiO₂ | SiO₂ | Mn | MgO | B | Na₂O | Others | Cu | Ni | Mo | Coating ratio wt. % | Remark |
|---|---|---|---|---|---|---|---|---|---|---|---|---|---|---|
| A | 31.3 | 17.2 | 14.2 | 13.6 | 13.6 | 1.4 | — | 4.4 | 4.4 | — | — | 0.14① | 18 | Example |
| B | 27.3 | 8.5 | 17.1 | 24.4 | 10.2 | 5.7 | — | 3.5 | 3.3 | — | — | 0.45① | 14 | Example |
| C | 33.3 | 22.0 | 10.2 | 12.5 | 7.8 | 5.5 | — | 4.8 | 3.9 | — | — | 1.0② | 14 | Example |
| D | 27.2 | 11.7 | 14.5 | 23.1 | 13.6 | 0.9 | 0.19 | 4.8 | 3.9 | 0.50② | 0.50② | 0.14① | 11 | Example |
| E | 27.5 | 8.5 | 11.4 | 12.7 | 15.7 | 1.5 | — | 4.3 | 18.4 | 2.6① | 0.05① | — | 17 | Comparative Example |
| F | 31.3 | 17.2 | 12.2 | 14.5 | 13.6 | 2.3 | — | 4.4 | 4.4 | — | — | — | 14 | Comparative Example |
| G | 28.1 | 15.2 | 11.2 | 15.3 | 10.6 | 1.5 | — | 3.8 | 14.3 | — | 0.18① | 1.9② | 18 | Comparative Example |
| H | 27.8 | 15.3 | 17.2 | 13.1 | 13.9 | 2.0 | — | 4.7 | 6.0 | 0.40① | 0.35① | 0.14① | 14 | Example |
| I | 31.3 | 16.0 | 14.2 | 14.8 | 13.6 | 1.2 | — | 4.5 | 4.4 | — | — | — | 7 | Comparative Example |
| J | 29.3 | 12.5 | 15.2 | 17.5 | 14.2 | 3.2 | — | 4.0 | 4.1 | — | — | 0.45① | 23 | Comparative Example |
| K | 31.9 | 6.5 | 7.0 | 28.8 | 15.4 | 1.0 | 0.19 | 4.1 | 5.1 | 0.25① | 0.25① | 0.14① | 14 | Comparative Example |
| L | 27.5 | 10.5 | 12.1 | 31.2 | 10.7 | — | — | 4.4 | 3.5 | — | — | 0.45① | 14 | Comparative Example |
| M | 29.1 | 30.5 | 12.8 | 8.6 | 10.4 | 1.9 | — | 3.2 | 3.5 | — | — | 0.45① | 14 | Comparative Example |
| N | 28.8 | 9.0 | 23.3 | 12.5 | 7.2 | 11.2 | — | 4.4 | 3.6 | — | — | 0.45① | 14 | Comparative Example |
| O | 27.5 | 11.0 | 19.7 | 13.1 | 5.0 | — | — | 4.5 | 6.8 | 0.15① | 0.18① | 0.14① | 14 | Example |

(Note. 1) Na₂O is contained as a main component of caking additive.
(Note. 2) "Others" are components included in a trace such as Cu, Ni, Mo, Al₂O₃, ZrO₂, K₂O etc.
(Note. 3) ① indicates the addition to the coating agent and ② indicates the addition to the core wire.

TABLE 7

| Code | Weldability | Solidification crack | Cold crack | Yield Strength (N/mm²) | Charpy absorption energy (J) | Preferential corrosion rate (mm/y) | Comprehensive evaluation | Remark |
|---|---|---|---|---|---|---|---|---|
| A | Good | Good | Good | 508 | 73 | 0.0 | Good | Example |
| B | Good | Good | Good | 535 | 75 | 0.0 | Good | Example |
| C | Good | Good | Good | 613 | 66 | 0.0 | Good | Example |
| D | Good | Good | Good | 588 | 115 | 0.0 | Good | Example |
| E | Good | Bad | Good | 521 | 68 | 0.0 | Bad | Comparative Example |
| F | Good | Good | Good | 478 | 88 | 0.60 | Bad | Comparative Example |
| G | Good | Good | Bad | 665 | 65 | 0.0 | Bad | Comparative Example |
| H | Good | Good | Good | 568 | 85 | 0.0 | Good | Example |
| I | Bad | Good | Good | — | — | — | Bad | Comparative Example |
| J | Bad | Good | Good | — | — | — | Bad | Comparative Example |
| K | Bad | Good | Good | — | — | — | Bad | Comparative Example |
| L | Bad | Good | Good | — | — | — | Bad | Comparative Example |
| M | Bad | Good | Good | — | — | — | Bad | Comparative Example |
| N | Bad | Good | Good | — | — | — | Bad | Comparative Example |
| O | Good | Good | Good | 542 | 81 | 0.0 | Good | Example |

What is claimed is:

1. A girth-welding process for a pipe comprising the steps of:
welding a base metal containing, by weight %, 0.03 to 0.15% of C, 0.05 to 0.50% of Si, 0.50% to 2.00% of Mn and 0.005 to 0.10% of Al, and having Fe and inevitable impurities for the balance,
using a high cellulose type coated arc welding electrode with a core wire made of a mild steel or low alloy steel and a coating flux which is made by kneading a coating flux starting material containing cellulose with a binder and applied to the peripheral surface of the core wire, said coating flux containing relative to the total amount of the coating flux, 0.1 to 7.0% of MgO, 7 to 25% of iron oxides (in FeO equivalent), 8 to 19% of $TiO_2$, 10 to 30% of $SiO_2$ and 5 to 27% of Mn, and said core wire and/or coating flux containing 0.06 to 1.10% of Mo relative to the total amount of the welding electrode; a ratio of the weight of the coating flux to the weight of the welding electrode being 0.10 to 0.19;

welding under the conditions that the core wire of the electrode is 3.2 to 4.8 mm in diameter, the current used is DCEP (direct current electrode positive), the welding current is within 90 to 240 A, the welding speed is 100 to 450 mm/min and the welding position is effected in all position downward welding, thereby, producing a weld zone composed of a weld metal containing, by weight %, 0.05 to 0.20% of C, 0.05 to 0.45% of Si, 0.50 to 2.00% of Mn and 0.03 to 1.05% of Mo, and having Fe and inevitable impurities for the balance, said weld metal further containing 0.15 to 2.00% of Cu+Ni and/or 0.0005 to 0.0050% of B;

the content of said impurities being limited to 0.030% or less of P, 0.030% or less of S, 0.10% or less of Al, 0.050% or less of N, 0.10% or less of Nb, 0.10% or less of V, 0.10% or less of Ti, 1.00% or less of Cr, 0.0025% or less or Ca, 0.10% or less of O, and 0.05% or less of Zr;

wherein said weld metal is regulated such that the difference between the Mo content (Mo)1 in the weld metal and the Mo content (Mo)2 in a base metal, that is, $\Delta Mo$ (=(Mo)1−(Mo)2) is 0.03% or more, and PCM is 0.30% or less, where PCM is defined as the following expression:

$$PCM=(C)+(Si)/30+(Mn)/20+(Cu)/20+(Ni)/60+(Cr)/20+(Mo)/15+(V)/10+5(B)$$

(here, (M) denotes a content (by weight %) of a component M in the weld metal.)

2. A girth-welding process for a pipe according to claim 1; wherein said base metal further contains at least one component selected from the group of 0.05 to 2.0% of Cu, 0.05 to 2.0% of Ni, 0.05 to 2.0% of Cr, 0.05 to 1.0% of Mo, 0.005 to 0.20% of Nb, 0.005 to 0.20% of V, 0.005 to 0.20% of Ti, 0.0005 to 0.0020% of B and 0.0005 to 0.0050% of Ca.

3. A girth-welding process for a pipe according to claim 1 or 2; wherein said weld metal further contains 0.15 to 2.00% of Cu+Ni, and/or 0.0005 to 0.0050% of B.

4. A high cellulose type coated electrode comprising:
a core wire made of a mild steel or a low alloy steel; and
a coating flux being prepared by kneading a coating flux starting material containing cellulose with a binder and applied to the peripheral surface of the core wire;
said coating flux containing relative to the total amount of the coating flux, 0.1 to 7.0% of MgO, 7 to 25% of iron oxides (in FeO equivalent), 8 to 19% of $TiO_2$, 10 to 30% of $SiO_2$ and 5 to 27% of Mn;
said core wire and/or said coating flux containing 0.06 to 1.10% of Mo relative to the total amount of the welding electrode; and
a ratio of the weight of the coating flux to the weight of the welding electrode being 0.10 to 0.19.

5. An high cellulose type coated electrode according to claim 4, wherein said core wire and/or said coating flux further contains 0.30 to 2.00% of Cu+Ni relative to the total amount of the welding electrode, and/or said coating flux further contains 0.05 to 0.5% of B relative to the total amount of the coating flux.

6. An high cellulose type coated electrode according to claim 4, wherein said Mo content is higher by 0.06% or more than the Mo content of a base metal to be welded.

* * * * *